US009799920B2

United States Patent
Asano et al.

(10) Patent No.: US 9,799,920 B2
(45) Date of Patent: *Oct. 24, 2017

(54) ALL-SOLID LITHIUM SECONDARY BATTERY

(71) Applicant: PANASONIC INTELLECTUAL PROPERTY MANAGEMENT CO., LTD., Osaka (JP)

(72) Inventors: Tetsuya Asano, Kyoto (JP); Tomoyuki Komori, Osaka (JP); Eiji Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 329 days.

This patent is subject to a terminal disclaimer.

(21) Appl. No.: 14/700,085

(22) Filed: Apr. 29, 2015

(65) Prior Publication Data

US 2015/0236375 A1    Aug. 20, 2015

Related U.S. Application Data

(63) Continuation of application No. PCT/JP2014/003276, filed on Jun. 18, 2014.

(30) Foreign Application Priority Data

Aug. 29, 2013  (JP) .................................. 2013-177675

(51) Int. Cl.
H01M 10/0562    (2010.01)
H01M 10/0525    (2010.01)
H01M 4/525      (2010.01)

(52) U.S. Cl.
CPC ....... *H01M 10/0562* (2013.01); *H01M 4/525* (2013.01); *H01M 10/0525* (2013.01); *H01M 2300/0071* (2013.01)

(58) Field of Classification Search
None
See application file for complete search history.

(56) References Cited

U.S. PATENT DOCUMENTS

2006/0134522 A1    6/2006  Zhang et al.
2007/0125638 A1    6/2007  Zhang et al.
(Continued)

FOREIGN PATENT DOCUMENTS

JP    2003-132887 A    5/2003
JP    2008-523567 A    7/2008
(Continued)

OTHER PUBLICATIONS

Masaaki Hirayama et al., "Characterization of electrode/electrolyte interface for lithium batteries using in situ synchrotron X-ray reflectometry—A new experimental technique for LiCoO2 model electrode", Journal of Power Sources, vol. 168, Mar. 19, 2007, pp. 493-500.
(Continued)

*Primary Examiner* — Daniel Gatewood
(74) *Attorney, Agent, or Firm* — McDermott Will & Emery LLP

(57) ABSTRACT

An exemplary lithium secondary battery includes: a positive electrode including a positive-electrode active substance layer 103; a negative electrode; and a solid electrolyte layer 104. The positive-electrode active substance layer 103 comprises lithium cobaltate, and has an α-NaFeO$_2$ type crystal structure. The positive-electrode active substance layer 103 includes a lower layer 103a, and an upper layer 103b interposed between the lower layer and the solid electrolyte layer. The lower layer 103a is oriented in the (110) plane. The upper layer 103b is composed only of first regions 103b1 oriented in the (110) plane and second regions 103b2 oriented in the (018) plane, the first and second regions being mixedly present in the xy plane of the positive- (Continued)

electrode active substance layer. The solid electrolyte layer 104 comprises lithium lanthanum titanate, and has a tetragonal perovskite-type crystal structure. The solid electrolyte layer 104 is oriented in the (110) or (102) plane.

9 Claims, 5 Drawing Sheets

(56) References Cited

U.S. PATENT DOCUMENTS

| | | | |
|---|---|---|---|
| 2012/0237835 A1* | 9/2012 | Yada | H01B 1/122 429/320 |
| 2013/0045424 A1* | 2/2013 | Sugiura | C01G 45/1228 429/231.8 |
| 2013/0149604 A1* | 6/2013 | Fujiki | H01M 4/667 429/211 |
| 2014/0308590 A1* | 10/2014 | Ohta | H01B 1/122 429/403 |

FOREIGN PATENT DOCUMENTS

| | | |
|---|---|---|
| JP | 2008-226639 A | 9/2008 |
| JP | 2009-218123 A | 9/2009 |
| JP | 2009-295514 A | 12/2009 |
| JP | 2009-301850 A | 12/2009 |
| JP | 2012-171803 A | 9/2012 |
| WO | WO 2013099442 A1 * 7/2013 | ............. H01B 1/122 |

OTHER PUBLICATIONS

International Search Report issued in International Application No. PCT/JP2014/003276 dated Jul. 22, 2014, with English Translation.
Co-pending U.S. Appl. No. 14/699,711 filed Apr. 29, 2015.

* cited by examiner

ALL-SOLID LITHIUM SECONDARY BATTERY

This is a continuation of International Application No. PCT/JP2014/003276, with an international filing date of Jun. 18, 2014, which claims priority of Japanese Patent Application No. 2013-177675, filed on Aug. 29, 2013 the contents of which are hereby incorporated by reference.

BACKGROUND

1. Technical Field

The present application relates to an all-solid lithium secondary battery.

2. Description of the Related Art

An all-solid lithium secondary battery in which a solid material is used as the electrolyte is safer in principle than conventional lithium secondary batteries in which a combustible liquid electrolyte is used, and can attain high energy density. Therefore, in recent years, research and development of all-solid lithium secondary batteries is being actively conducted.

An all-solid lithium secondary battery includes a positive-electrode active substance layer and a negative-electrode active substance layer, and a solid electrolyte layer interposed between these active substance layers. The positive-electrode active substance layer and the negative-electrode active substance layer both contain an active substance which is capable of occlusion and release of lithium ions. In an all-solid lithium secondary battery, with oxidation/reduction of the positive electrode and the negative electrode, lithium ions migrate in the solid electrolyte layer between the positive-electrode active substance layer and the negative-electrode active substance layer, whereby the lithium secondary battery can be charged or discharged.

An active substance occludes or releases lithium ions with charging and discharging. Therefore, the active substance expands or contracts with every charging and discharging cycle, so that stress due to expansion and contraction of the active substance occurs at the interface between the active substance layer and the solid electrolyte layer. Therefore, when charge/discharge cycles are repeated, the strength of adherence between the active substance layer and the solid electrolyte layer may decrease, thus leading to an increased interface resistance. This may cause a decrease in the battery output power. In some cases, the solid electrolyte layer may peel from the active substance layer, so that the battery may no longer function.

In answer thereto, Japanese Laid-Open Patent Publication No. 2008-226639 (hereinafter "Patent Document 1") proposes an active substance layer which includes a plurality of electrode elements that are disposed at intervals on a solid electrolyte layer. Patent Document 1 states that this construction alleviates the stress caused by expansion and contraction of the active substance (electrode element) due to charging and discharging, and that the cycle characteristics of the all-solid lithium secondary battery can be improved.

SUMMARY

The inventors have found that, in the all-solid lithium secondary battery disclosed in Patent Document 1, the output characteristics may be deteriorated when a predetermined capacity is to be ensured. The details will be described later.

One illustrative embodiment of the present disclosure provides a novel solid lithium secondary battery having high charge-discharge cycle characteristics and high output characteristics.

An all-solid lithium secondary battery according to an embodiment of the present application comprises: a positive electrode including a positive-electrode active substance layer; a negative electrode including a negative-electrode active substance layer, the negative-electrode active substance layer allowing lithium ions to be inserted and allowing inserted lithium ions to be released; and a solid electrolyte layer interposed between the positive electrode and the negative electrode, wherein, the positive-electrode active substance layer comprises lithium cobaltate, and has an $\alpha$-NaFeO$_2$ type crystal structure; given an x axis and a y axis which are defined as two axes that are parallel to a principal face of the positive-electrode active substance layer, and a z axis which is defined as an axis that is perpendicular to the principal face, the positive-electrode active substance layer has a multilayer structure including a lower layer and an upper layer which is interposed between the lower layer and the solid electrolyte layer; the lower layer is oriented in the (110) plane; the upper layer is composed only of first regions oriented in the (110) plane and second regions oriented in the (018) plane, the first regions and second regions being mixedly present in an xy plane of the positive-electrode active substance layer; the solid electrolyte layer comprises lithium lanthanum titanate and has a tetragonal perovskite-type crystal structure; and the solid electrolyte layer is oriented in the (110) plane or the (102) plane.

A solid lithium secondary battery according to an embodiment of the present disclosure has high charge-discharge cycle characteristics and high output characteristics.

Specifically, a positive-electrode active substance layer of lithium cobaltate includes a lower layer oriented in the (110) plane and an upper layer which is composed only of first regions oriented in the (110) plane and second regions oriented in the (018) plane. Therefore, at the interface between the positive-electrode active substance layer and the solid electrolyte layer, deteriorations in strength of adherence due to repeated charge/discharge cycles can be suppressed. Thus, deteriorations in charge-discharge cycle characteristics due to peeling of the solid electrolyte layer can be suppressed.

Moreover, in the positive-electrode active substance layer, the plane of lithium diffusion is aligned in a direction which is parallel to or at an angle of 55° with the charging/discharging current directions, whereby the diffusion distance of lithium in the positive-electrode active substance layer can be reduced. Furthermore, the solid electrolyte layer of lithium lanthanum titanate is oriented in the (110) plane or the (102) plane, so that deteriorations in lithium conductivity associated with crystal grain boundaries can be suppressed. Thus, it is possible to ensure sufficient output characteristics.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
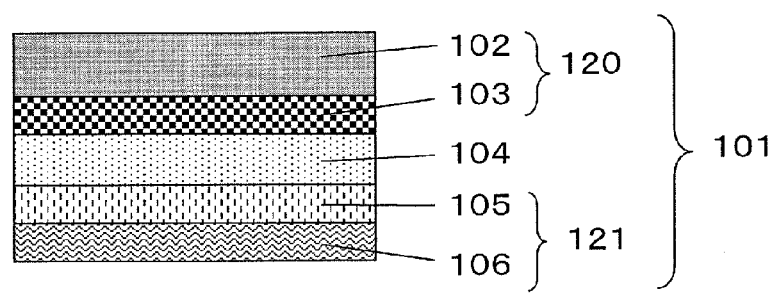
FIG. 1A is a cross-sectional view illustrating a first embodiment of an all-solid lithium secondary battery.

The inventors have found a problem in that, in a conventional all-solid lithium secondary battery in which lithium cobaltate is used as the positive-electrode active substance, it is difficult to suppress deteriorations in cycle characteristics that are caused by expansion and contraction of the active substance due to charging and discharging, while ensuring high output power. Hereinafter, the problem which the inventors have found through their studies will be described in detail.

A crystal of lithium cobaltate has a laminar rock salt structure, in which layers of cobalt oxide and layers of lithium are alternately stacked. Lithium ions are likely to migrate along these layers. In other words, when crystalline lithium cobaltate is used as the positive-electrode substance layer, the lithium cobaltate crystal may be disposed so that each layer in the laminar rock salt structure extends perpendicular to the principal face of the positive electrode, whereby it becomes easy to effect insertion/release of lithium ions to/from the lithium cobaltate, thus presumably enhancing the output power of the lithium secondary battery. For example, Non-Patent Document (Surface & Coatings Technology 218 (2013) 57-61) and Non-Patent Document 2 (Journal of Power Sources 168(2007) 493-500) show discussions of the relationship between the crystal orientation of lithium cobaltate and output characteristics.

In the above case, with insertion/release of lithium ions, the positive-electrode active substance layer repeats expansion and contraction in a parallel direction to the principal face of the positive electrode. When this positive-electrode active substance layer is placed on the surface of a solid electrolyte layer to construct a secondary battery, the strength of adherence between the positive-electrode active substance layer and the solid electrolyte layer will be deteriorated with repeated charging and discharging, possibly causing the solid electrolyte layer to peel off the positive-electrode active substance layer.

On the other hand, if the lithium cobaltate crystal is disposed so that each layer in the laminar rock salt structure extends parallel to the principal face, the directions of expansion/contraction of the positive-electrode active substance layer will be perpendicular to the principal face of the positive electrode. Therefore, presumably deteriorations in the adherence between the positive-electrode active substance layer and the solid electrolyte layer will be reduced. In this case, however, lithium ion exchange will not smoothly occur, so that high output power may not be obtained.

On the other hand, in the electrode structure disclosed in Patent Document 1, the volumetric ratio which the active substance accounts for in the entire active substance layer is small; that is, the active substance layer includes, in a large volume, portions that do not contribute to reaction. When a predetermined capacity is to be ensured, this results in a need for employing a thick active substance layer. This creates a long diffusion path of lithium ions, and thus an increased resistance against lithium ion migration, so that high output characteristics cannot be obtained. Note that, if the volumetric ratio of the active substance in the entire active substance layer were to be increased in order to ensure a predetermined capacity, the strain energy associated with expansion/contraction of the active substance would increase, so that the high charge-discharge cycle characteristics which is the aim of Patent Document 1 would no longer be obtained.

Thus, with conventional all-solid lithium secondary batteries, it is difficult to reconcile high output power and improvement in charge-discharge cycle characteristics.

With further studies, the inventors found a novel electrode structure which, by utilizing the crystal structure of lithium cobaltate, provides improved charge-discharge cycle characteristics while ensuring high output power, thus arriving at the present disclosure.

All-solid lithium secondary batteries according to embodiments of the present application are as follows.

An all-solid lithium secondary battery according to an embodiment of the present application comprises: a positive electrode including a positive-electrode active substance layer; a negative electrode including a negative-electrode active substance layer, the negative-electrode active substance layer allowing lithium ions to be inserted and allowing inserted lithium ions to be released; and a solid electrolyte layer interposed between the positive electrode and the negative electrode, wherein, the positive-electrode active substance layer comprises lithium cobaltate, and has an α-NaFeO$_2$ type crystal structure; given an x axis and a y axis which are defined as two axes that are parallel to a principal face of the positive-electrode active substance layer, and a z axis which is defined as an axis that is perpendicular to the principal face, the positive-electrode active substance layer has a multilayer structure including a lower layer and an upper layer which is interposed between the lower layer and the solid electrolyte layer; the lower layer is oriented in the (110) plane; the upper layer is composed only of first regions oriented in the (110) plane and second regions oriented in the (018) plane, the first regions and second regions being mixedly present in an xy plane of the positive-electrode active substance layer; the solid electrolyte layer comprises lithium lanthanum titanate and has a tetragonal perovskite-type crystal structure; and the solid electrolyte layer is oriented in the (110) plane or the (102) plane.

A [−441] direction in the first regions may be parallel to a [−4-81] direction in the second regions, and a [2-21] direction in the first regions may be parallel to a direction in the second regions.

A thickness Tb of the upper layer may be greater than a thickness Ta of the lower layer.

A ratio Ta/Tb between a thickness Ta of the lower layer and a thickness Tb of the upper layer may be not less than 0.1 and not more than 1.

In an X-ray diffraction pattern of the lithium cobaltate, a ratio (I(110)/I(018)) between a peak intensity I(110) of the (110) plane and a peak intensity I(018) of the (018) plane may satisfy the relationship 0.9≤I(110)/I(018) 3.1.

The positive-electrode active substance layer may be an epitaxial film.

The positive-electrode active substance layer may be formed on a current collector which is a strontium titanate substrate, the strontium titanate substrate being doped with a dopant and electrically conductive.

The solid electrolyte layer may be an epitaxial film.

In the upper layer of the positive-electrode active substance layer, there may be no overlap between the first regions and the second regions along the z axis direction.

First Embodiment

With reference to the drawings, an all-solid lithium secondary battery according to the first embodiment will be described.

FIG. 1A is a schematic cross-sectional view of an all-solid lithium secondary battery 101 according to the present embodiment.

The all-solid lithium secondary battery 101 includes a positive electrode 120, a negative electrode 121, and a solid electrolyte layer 104 interposed between the positive electrode 120 and the negative electrode 121.

The positive electrode 120 includes a positive-electrode current collector 102 and a positive-electrode active substance layer 103. The positive-electrode active substance layer 103 is in contact with the positive-electrode current collector 102, and connected in electrical series to the positive-electrode current collector 102. Similarly, the negative electrode 121 includes a negative-electrode current collector 106 and a negative-electrode active substance layer 105. The negative-electrode active substance layer 105 is in contact with the negative-electrode current collector 106, and connected in electrical series to the negative-electrode current collector 106. The solid electrolyte layer 104 is interposed between and in contact with the positive-electrode active substance layer 103 and the negative-electrode active substance layer 105.

Hereinafter, the constituent elements will be described in detail.

(Positive-Electrode Active Substance Layer 103)

Figure 1B:
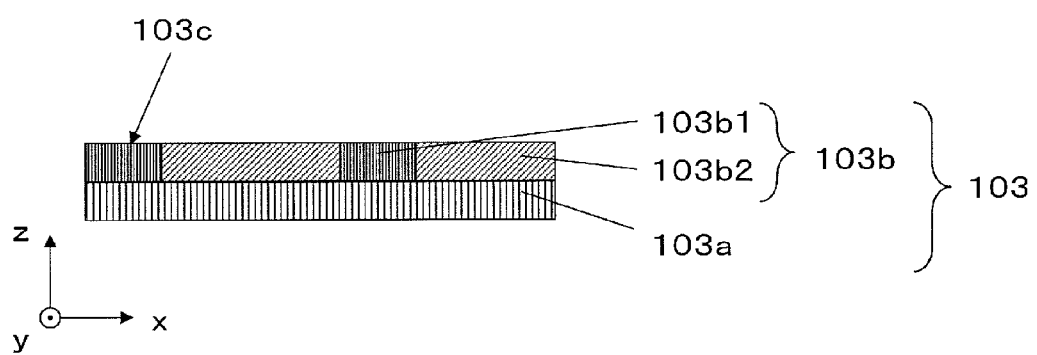
FIG. 1B is a cross-sectional view of the positive-electrode active substance layer.

FIG. 1B is a schematic cross-sectional view of a positive-electrode active substance layer 103 according to the present embodiment. In the following description, the z axis is defined in a direction perpendicular to a principal face 103c of the positive-electrode active substance layer 103, whereas the x axis and the y axis are defined as two orthogonal axes which lie in the principal face of the positive-electrode active substance layer 103.

The positive-electrode active substance layer 103 has a multilayer structure which includes, in this order from the positive-electrode current collector 102, a lower layer 103a and an upper layer 103b. The upper layer 103b is interposed between the lower layer 103a and the solid electrolyte layer 104, and are in contact with them.

The positive-electrode active substance layer 103 (the lower layer 103a and the upper layer 103b) is composed of a hexagonal material of lithium cobaltate (LiCoO$_2$). More specifically, lithium cobaltate has an α-NaFeO$_2$ type crystal structure. Moreover, the positive-electrode active substance layer 103 may be of any composition other than the aforementioned composition, so long as it has an α-NaFeO$_2$ type crystal structure and is capable of lithium insertion and release. For example, some of the Co sites in lithium cobaltate may be substituted by other metals, e.g., Ni. In other words, it may be of a composition expressed as LiCo$_{1-x}$M$_x$O$_2$ (0≤x<1, M is one or more elements selected from among Ni, Mn, and Al). So long as the Li/Co the composition ratio in a discharged state is within the range of 0.9 to 1.1, the composition ratio between Li and the metal oxide does not need to be 1:1. Moreover, x can be set within a range such that the NaFeO$_2$ crystal structure is not lost; preferably, 0≤x<0.66. Note that the x value and metal M may be identical or different between the lower layer 103a and the upper layer 103b. Moreover, the positive-electrode active substance layer 103 may contain impurities so long as it contains lithium cobaltate of the aforementioned composition as the main component.

The lower layer 103a has the (110) plane oriented in the z axis direction, i.e., the lower layer 103a is a crystalline region which is oriented in the (110) plane with respect to the z axis direction. Note that a plane orientation generally refers to an orientation relative to the normal direction of the principal face of a given layer, and thus the expression "in the z axis direction" or "with respect to the z axis direction" may occasionally be omitted in the following description.

As shown in FIG. 1B, the upper layer 103b includes a plurality of first regions 103b1 and a plurality of second regions 103b2. The first regions 103b1 are crystalline regions which are oriented in the (110) plane with respect to the z axis direction, and the second regions 103b2 are crystalline regions which are oriented in the (018) plane with respect to the z axis direction. More specifically, the upper layer 103b only includes the first regions 103b1 and the second regions 103b2. As used herein, to "only include the first regions 103b1 and the second regions 103b2" means that, when the upper layer 103b is subjected to X-ray diffraction intensity measurement, an integral value of a total of the peaks associated with any crystal which is oriented in the (110) plane and the peaks associated with any crystal oriented in the (018) plane accounts for 95% or more of an integral value of all diffraction peaks.

In the first regions 103b1 and in the second regions 103b2, the upper layer 103b is a substantially single crystal. Although a plurality of single-crystalline regions exist in the upper layer 103b, the orientation of each single crystal is (110) or (018), rather than being random. In this regard, it can be said that the upper layer 103b is not polycrystalline.

The ratio (I(110)/I(018)) between peak intensity I(110) of the (110) plane and peak intensity I(018) of the (018) plane in the positive-electrode active substance layer 103 may satisfy the relationship 0.9≤I(110)/I(018)≤3.1, for example. If this ratio is equal to or less than 0.9, the proportion of the regions which are oriented in the (110) plane in the positive-electrode active substance layer 103 will become smaller, so that high output power characteristics may not be adequately obtained. If this ratio is equal to or greater than 3.1, an adequate effect of suppressing expansion/contraction of the positive-electrode active substance layer 103, as described below, may not be obtained.

The plurality of first regions 103b1 and the plurality of second regions 103b2 are mixedly present within in the xy plane which is perpendicular to the z axis (i.e., a plane which is parallel to the principal face 130c). As shown in FIG. 1B, the first regions 103b1 and the second regions 103b2 may be disposed so as to have no overlap along the z axis direction. Since no crystal grain boundaries exist along the z axis direction in such a construction, lithium is likely to diffuse along the z axis direction. The layout of the first regions 103b1 and the second regions 103b2 in the lower layer 103a and the upper layer 103b can be confirmed via TEM observation of a cross section of the positive-electrode active substance layer 103.

Figure 2A:
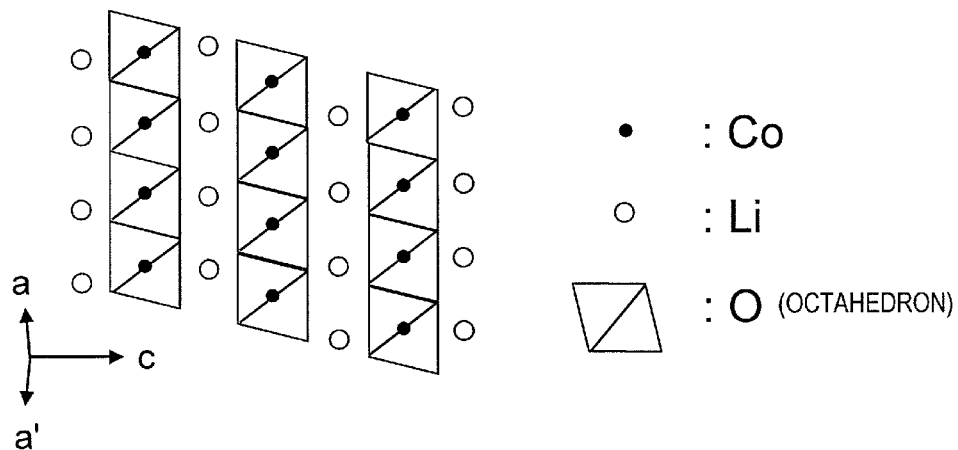
FIG. 2A shows a relationship between the crystal structure of lithium cobaltate and the crystal axis.

FIG. 2A schematically shows the crystal structure of lithium cobaltate. In FIG. 2A, each black circle represents a cobalt (Co), each white circle represents a lithium (Li), and each octahedron depicts oxygens (O) located at the respective apices of the octahedron. Layers of cobalt oxide, each including a two-dimensional array of octahedrons of oxygens with a cobalt in the center, and layers of lithiums, are alternately stacked. The $\alpha$-NaFeO$_2$ type crystal structure is a hexagonal system where, given a c axis which is the direction in which cobalt oxide layers and Li layers are stacked, an a axis and an a' axis constituting an angle of 120° with the a axis can be defined within the plane in which each cobalt oxide layer or each Li layer expands. Given an aa' plane that contains the a axis and the a' axis, lithium migrates or diffuses in the aa' plane within the crystal structure of lithium cobaltate.

As shown in FIG. 1B, the z axis is defined in a direction perpendicular to the principal face 103c of the positive-electrode active substance layer 103, whereas the x axis and the y axis are defined in two directions which are parallel to the principal face 103c and perpendicular to the z axis, these two directions being orthogonal to each other.

In this case, in the first regions 103b1 oriented in the (110) plane of the lower layer 103a and the upper layer 103b, the aa' plane and the z axis are parallel to each other. In the second regions 103b2 oriented in the (018) plane, the aa' plane and the z axis constitute an angle of 55°.

Figure 2B:
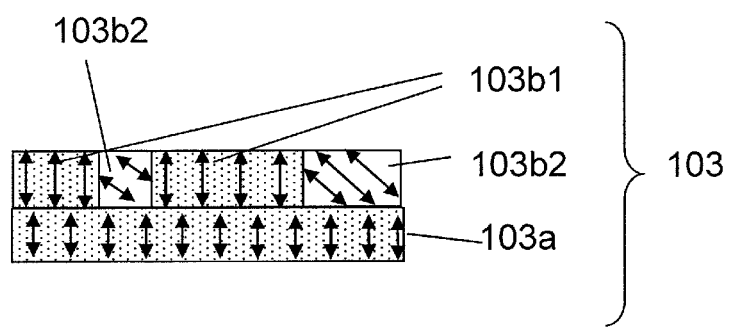
FIG. 2B shows directions of lithium insertion/release in the positive-electrode active substance layer according to the first embodiment.

FIG. 2B shows directions, indicated by arrows, in which lithium diffuses in the aa' plane in the positive-electrode active substance layer 103. As shown in FIG. 2B, in the lower layer 103a and the first regions 103b1 oriented in the (110) plane, lithium ions migrate in a direction perpendicular to the principal face 103c of the positive-electrode active substance layer 103 (the z axis direction), that is, along the thickness direction of the positive-electrode active substance layer 103. On the other hand, in the second regions 103b2 oriented in the (018) plane, lithium ions migrate in a direction which is inclined by 55° from the normal of the principal face 103c (i.e., 35° from the principal face 103c). Thus, in the lower layer 103a and the first regions 103b1, lithium ions are likely to migrate along the thickness direction of the positive-electrode active substance layer 103; since this reduces the lithium diffusion distance, it becomes possible to insert lithium ions or release inserted lithium ions in short periods of time. Moreover, in the lower layer 103a, and in the first regions 103b1 and second regions 103b2 of the upper layer 103b, it is unlikely for thickness-direction lithium diffusion to be hindered since no crystal grain boundary exists along the thickness direction.

In the second regions 103b2, the direction of lithium ion migration being inclined from the thickness direction makes for a longer diffusion distance. However, since the inclination is 55° from the normal of the principal face 103c, the diffusion distance is only about 1.7 times longer, which is not too long.

Furthermore, as will be described later, the solid electrolyte layer 104 is a region which is oriented in the (110) plane or the (102) plane, and has a crystal structure such that lithium is likely to diffuse along the thickness direction.

Therefore, in the entire positive-electrode active substance layer 103 and the solid electrolyte layer 104, it becomes easy to effect insertion/release of lithium ions to/from the lithium cobaltate, whereby the lithium secondary battery can attain high output power.

Figure 2C:
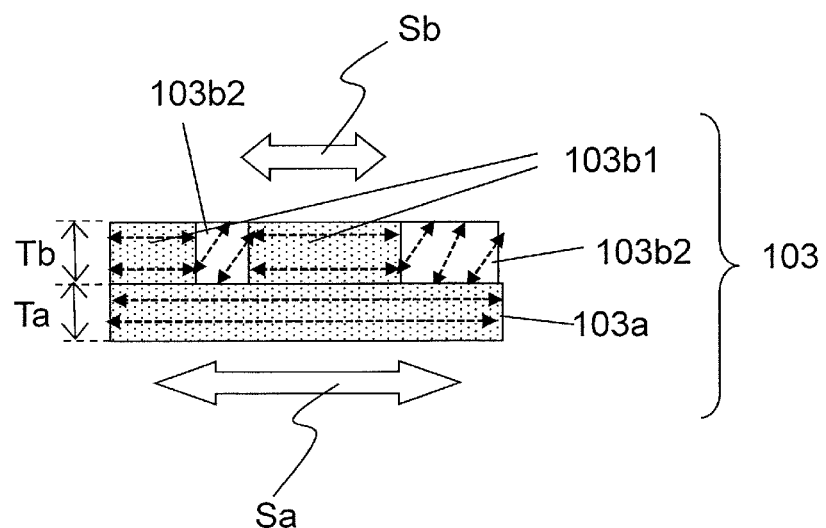
FIG. 2C shows directions of expansion/contraction in the positive-electrode active substance layer according to the first embodiment.

FIG. 2C shows directions of expansion/contraction in the positive-electrode active substance layer 103 due to charging and discharging. As shown in FIG. 2C, in the lower layer 103a oriented in the (110) plane, the positive-electrode active substance layer expands or contracts in a direction parallel to the principal face 103c of the positive-electrode active substance layer 103, and hardly expands or contracts in a perpendicular direction thereto. Therefore, as indicated by arrow Sa, the lower layer 103a incurs stress in a direction parallel to the principal face 103c.

Similarly in the first regions 103b1 of the upper layer 103b, too, the positive-electrode active substance layer expands or contracts in a direction parallel to the principal face 103c of the positive-electrode active substance layer 103, and hardly expands or contracts in a perpendicular direction thereto. On the other hand, in the second regions 103b2 oriented in the (018) plane, the positive-electrode active substance layer 103 expands or contracts in a direction which is inclined by 35° from the normal of the principal face 103c (i.e., 55° from the principal face 103c), and hardly expands or contracts in a perpendicular direction thereto. The directions of expansion/contraction in these two regions are essentially orthogonal. Therefore, the second regions 103b2 suppress expansion of the first regions 103b1, while the first regions 103b1 suppress expansion of the second regions 103b2. As a result, expansion/contraction of the upper layer 103b due to charging and discharging is suppressed as a whole, as compared to the lower layer 103a. This makes the stress occurring in a direction parallel to the principal face 103c of the upper layer 103b smaller than that in the lower layer 103a, as indicated by arrow Sb.

Thus, the tensile stress occurring in the upper layer 103b due to lithium ion insertion is smaller than the tensile stress occurring in the lower layer 103a. Due to such a difference in tensile stress between the lower layer 103a and the upper layer 103b, the positive-electrode active substance layer 103 applies a compressive stress to the solid electrolyte layer 104 as a whole. This makes the solid electrolyte layer 104 less likely to peel off the positive-electrode active substance layer 103. Thus, it becomes possible to suppress deteriorations in charge-discharge cycle characteristics due to peeling of the solid electrolyte layer 104 can be suppressed, whereby charge-discharge cycle characteristics can be enhanced.

Although there is no particular limitation as to the thickness Ta, Tb of the lower layer 103a and the upper layer 103b, it is preferable that the ratio Ta/Tb of the thickness Ta of the lower layer 103a to the thickness Tb of the upper layer 103b is not less than 0.1 and not more than 1 ($0.1 \leq Ta/Tb \leq 1$). When the thickness Ta of the lower layer 103a is equal to or less than the thickness Tb of the upper layer 103b ($Ta/Tb \leq 1$), the influence of the tensile stress occurring in the lower layer 103a can be reduced, whereby the positive-electrode active substance layer 103 is restrained from peeling or becoming detached off the positive-electrode current collector 102. For example, the thickness Ta of the lower layer 103a is less than the thickness Tb. When the thickness Ta of the lower layer 103a is 1/10 or more of the thickness Tb of the upper layer 103b ($0.1 \leq Ta/Tb$), it is possible to increase the proportion that the regions (regions oriented in the (110) plane) in which insertion/desorption of lithium ions occurs with greater ease account for in the entire positive-electrode active substance layer 103, thus providing a more effective enhancement of output power.

(Solid Electrolyte Layer 104)

The solid electrolyte layer 104 is composed of lithium lanthanum titanate ($La_{2/3-x}Li_{3x}TiO_3$, $0 < x < 1/6$). Lithium lanthanum titanate has a tetragonal perovskite-type crystal structure. The solid electrolyte layer 104 may be an epitaxial film. For example, it may be a film which is epitaxially grown on the upper layer 103b of the positive-electrode active substance layer 103. In this case, the solid electrolyte layer 104 will be an epitaxial film that matches the crystal orientation of the upper layer 103b. In other words, it will be an epitaxial film having a crystal orientation that reflects the crystal orientation of the upper layer 103b. It can be confirmed via X-ray diffraction or TEM that the solid electrolyte layer 104 is a film which has epitaxially grown on the upper layer 103b as an underlayer. Note that the solid electrolyte layer 104 may contain impurities so long as it contains lithium lanthanum titanate of the above composition as the main component.

The solid electrolyte layer 104 is oriented in the (110) plane or the (102) plane with respect to the z axis. That is, the solid electrolyte layer 104 may be a crystalline region which is oriented in the (110) plane, or a crystalline region which is oriented in the (102) plane. Alternatively, these regions may be mixedly present. When the solid electrolyte layer 104 has such a crystal structure, it becomes possible to restrain grain boundaries from hindering lithium ion migration between the positive electrode 120 and the negative electrode 121, whereby lithium ion conductivity can be enhanced. For example, the solid electrolyte layer 104 is composed only of crystalline regions which are oriented in the (110) plane or the (102) plane. As a result, lithium-ion conductivity in the solid electrolyte layer 104 can be more effectively enhanced.

The x value in the composition of lithium lanthanum titanate ($La_{2/3-x}Li_{3x}TiO_3$) is preferably greater than 0.09 but less than 1/6 (or 0.167) ($0.09 < x < 0.167$). More preferably, it is greater than 0.10 but less than 0.12 ($0.10 < x < 0.12$). When the x value is in such ranges, lithium-ion conductivity of the solid electrolyte layer 104 can be more enhanced.

The composition of lithium lanthanum titanate is not limited to the aforementioned composition. It suffices if it has a tetragonal perovskite-type crystal structure and is capable of lithium insertion and release. For example, some of the metallic elements contained in the composition may be substituted by minute amounts of other metallic elements.

(Positive-Electrode Current Collector 102)

The positive-electrode current collector 102 is composed of an electron conductor which does not cause any chemical reaction with the ion conductor within the bounds of the designed applied voltage for the lithium secondary battery 101. For example, the positive-electrode current collector 102 is composed of stainless steel, aluminum, an aluminum alloy, platinum, gold, titanium, or the like. In particular, from the standpoint of electrical conductivity, resistance against the ion conductor, oxidation-reduction potential, etc., aluminum, an aluminum alloy, platinum, or gold may be selected.

In the case where the positive-electrode active substance layer 103 is epitaxially grown on the positive-electrode current collector 102, a material which permits orientation in the (110) plane or the (018) plane as mentioned above is to be used. For example, $SrTiO_3$ (STO) to which electrical conductivity is conferred through La or Nb doping, Pt or other metals epitaxially grown on an MgO substrate or an Si substrate, or the like can be used. Moreover, the positive-electrode active substance layer 103 may be formed on a substrate which permits epitaxial growth thereof, and the positive-electrode active substance layer 103 may be peeled off the substrate and then placed on a positive-electrode current collector 102 which is composed of a material such as stainless steel or aluminum.

(Negative-Electrode Active Substance Layer 105)

The negative-electrode active substance layer 105 contains a negative-electrode active substance which is composed of a compound capable of occluding and releasing lithium ions, e.g., a lithium alloy, an alloy, an intermetallic compound, carbon, an organic compound, an inorganic compound, a metal complex, or an organic polymer compound. These may be used each alone, or two or more such compounds may be used in combination. In addition to the active substance, the negative-electrode active substance layer 105 may contain an electrical conductivity aid, a binder, or the like. The negative-electrode active substance layer 105 may be a thin epitaxial film which is grown on the negative-electrode current collector 106 or the solid electrolyte layer 104.

(Negative-Electrode Current Collector 106)

The negative-electrode current collector 106 is composed of an electron conductor which does not cause any chemical reaction with the lithium ion-conductive electrolyte within the bounds of the applied voltage for the battery constructed. For example, stainless steel, nickel, copper, titanium, platinum, gold, or the like can be used. In particular, from the standpoint of electrical conductivity, resistance against the ion conductor, oxidation-reduction potential, etc., aluminum, an aluminum alloy, platinum, or gold may be selected. When the negative-electrode active substance layer 105 is epitaxially grown on the negative-electrode current collector 106, STO which has been doped with Nb or La may be used as the material of the negative-electrode current collector 106, for example.

In the all-solid lithium secondary battery of the present embodiment, the positive-electrode active substance layer 103 has a multilayer structure including: a lower layer 103a with a large expansion stress (tensile stress) along a direction parallel to the principal face 103c; and an upper layer 103b with a smaller expansion stress of the aforementioned kind than that of the lower layer 103a. Therefore, as has been described with reference to FIG. 2C, the solid electrolyte layer 104 is restrained from peeling off the positive-electrode active substance layer 103 due to expansion of the active substance, whereby charge-discharge cycle characteristics can be improved. Moreover, since the positive-electrode active substance layer 103 and the solid electrolyte layer 104 have a crystal structure which does not hinder lithium ion migration between the positive electrode 120 and the negative electrode 121, output characteristics can be enhanced. Thus, it is possible to realize good charge-discharge cycle characteristics while ensuring high output power.

Furthermore, according to the present embodiment, peeling of the solid electrolyte layer 104 due to expansion stress of the active substance can be suppressed even if the positive-electrode active substance layer 103 is made thick. Moreover, expansion stress in the active substance can be alleviated without providing any regions that do not contribute to reaction within the positive-electrode active substance layer 103 (e.g., the voids in the active substance layer of Patent Document 1). Thus, while enhancing charge-discharge cycle characteristics, a high capacity can be realized by increasing the amount of positive-electrode active substance. As a result, high capacity, high output power, and good charge-discharge cycle characteristics can be realized at the same time.

(Production Method for the all-Solid Lithium Secondary Battery 101)

Hereinafter, with reference to FIGS. 3A to 3E, a method for producing the all-solid lithium secondary battery 101 of the present embodiment will be described.

Figure 3A:
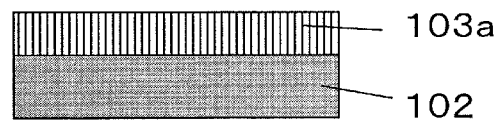
FIGS. 3A, 3B, 3C, 3D, and 3E are step-by-step cross-sectional views showing an exemplary production method for the all-solid lithium secondary battery according to the first embodiment.

First, as shown in FIG. 3A, an $SrTiO_3$ substrate doped with La is provided as the positive-electrode current collector 102. On the surface of the positive-electrode current collector 102, a lower layer 103a of lithium cobaltate is formed by a sputter deposition technique, a vacuum evaporation technique, a chemical vapor deposition (CVD) technique, a pulse laser deposition technique (hereinafter PLD), or a sol-gel technique. The lower layer 103a is formed under conditions that provide a crystal structure oriented in the (110) plane.

Figure 3B:
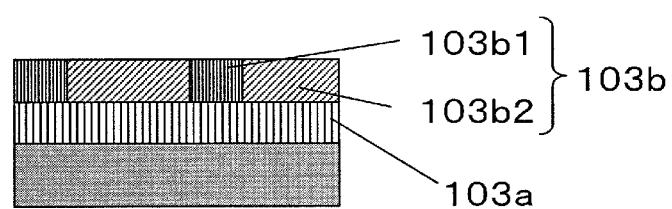

Next, as shown in FIG. 3B, an upper layer 103b of lithium cobaltate is formed on the lower layer 103a, thereby obtaining a positive-electrode active substance layer 103. Formation of the upper layer 103b can be conducted by a sputter deposition technique, a vacuum evaporation technique, a chemical vapor deposition (CVD) technique, a pulse laser deposition technique (hereinafter PLD), or a sol-gel technique. The upper layer 103b is formed under conditions such that the first regions 103b1 oriented in the (110) plane and the second regions 103b2 oriented in the (018) plane are mixedly present in the xy plane.

The conditions for forming the lower layer 103a and the upper layer 103b, in particular the conditions for controlling crystal orientations, may differ depending on the formation method for these layers, and may be set as appropriate. Regardless of which formation method is used, the conditions for obtaining desired oriented regions may be found in advance by trying film formation while varying a number of parameters. As one instance, when epitaxially growing the lower layer 103a and the upper layer 103b by PLD, no straightforward control parameters for controlling the mixing ratio between the regions oriented in the (110) plane and the regions oriented in the (018) plane were found through the inventors' studies. However, an overall tendency was observed that, as the energy of adsorbed atoms on the epitaxial growth surface increased, the proportion of the regions oriented in the (110) plane increased. Therefore, formation of the lower layer 103a may be conducted under conditions which lead to a high energy of adsorbed atoms on the epitaxial growth surface, whereas formation of the upper layer 103b may be conducted under conditions which lead to a lower energy of adsorbed atoms on the epitaxial growth surface. Note that the aforementioned energy can be adjusted via a number of parameters, e.g., laser pulse energy, pulse frequency, and substrate temperature.

Figure 3C:
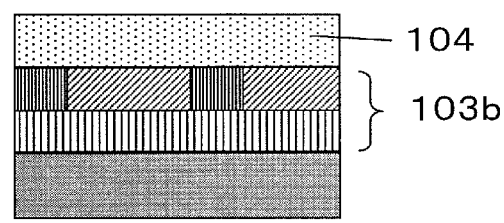

Next, as shown in FIG. 3C, a solid electrolyte layer 104 is formed on the upper layer 103b. Formation of the solid electrolyte layer 104 may be conducted by a sputter deposition technique, a vacuum evaporation technique, a CVD technique, PLD, a sol-gel technique, or the like, for example.

Figure 3D:
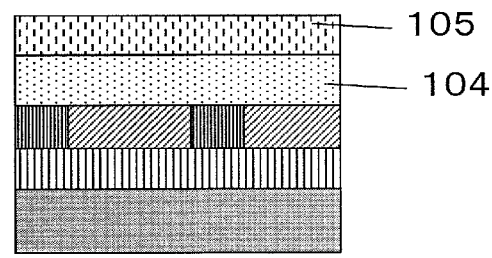

Next, as shown in FIG. 3D, a negative-electrode active substance layer 105 is formed on the solid electrolyte layer 104. Formation of the negative-electrode active substance layer 105 can be conducted by a sputter deposition technique, a vacuum evaporation technique, a CVD technique, PLD, a sol-gel technique, or the like.

Figure 3E:
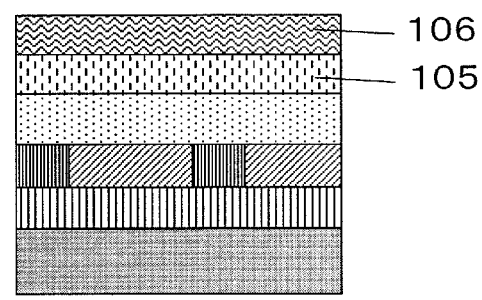

Thereafter, as shown in FIG. 3E, a negative-electrode current collector 106 is formed on the negative-electrode active substance layer 105. Formation of the negative-electrode current collector 106 can be conducted by a sputter deposition technique, a vacuum evaporation technique, a CVD technique, PLD, a sol-gel technique, or the like. Alternatively, a metal foil may be disposed as a negative-electrode current collector 106 on the negative-electrode active substance layer 105. In this manner, the all-solid lithium secondary battery 101 is produced.

The all-solid lithium secondary battery 101 of the present embodiment may be produced by, for example, epitaxially growing the lower layer 103a of the positive-electrode active substance layer 103, the upper layer 103b of the positive-electrode active substance layer 103, the solid electrolyte layer 104, and the negative-electrode active substance layer 105 in this order on the positive-electrode current collector 102.

The production method for the all-solid lithium secondary battery 101 is not limited to the aforementioned method. The aforementioned method forms the positive-electrode active substance layer 103, the solid electrolyte layer 104, the negative-electrode active substance layer 105, and the negative-electrode current collector 106 in this order on the positive-electrode current collector 102; conversely, the negative-electrode active substance layer 105, the solid electrolyte layer 104, the positive-electrode active substance layer 103, and the positive-electrode current collector 102 may be formed in this order on the negative-electrode current collector 106. For example, the negative-electrode active substance layer 105, the solid electrolyte layer 104, the upper layer 103b of the positive-electrode active substance layer 103, and the lower layer 103a of the positive-electrode active substance layer 103 may be epitaxially grown on the negative-electrode current collector 106 in this order.

The present disclosure permits various modifications, without being limited to the above embodiments. For example, in the upper layer 103b of the positive-electrode active substance layer 103, the first regions 103b1 and the second regions 103b2 may have overlaps along the thickness direction. In this case, crystal grain boundaries will be created along the thickness direction, so that the high output power characteristics of the lithium secondary battery may somewhat be deteriorated. However, since the upper layer 103b only includes the first regions 103b1 oriented in the (110) plane and the second regions 103b2 oriented in the (018) plane, expansion/contraction across the entire upper layer 103b is kept smaller than in the lower layer 103a, whereby similar effects to those of the aforementioned embodiment can be obtained. In other words, while ensuring high output power, peeling of the solid electrolyte layer 104 can be suppressed, and charge-discharge cycle characteristics can be enhanced.

Furthermore, it suffices if the positive-electrode active substance layer 103 includes the upper layer 103b in contact with the solid electrolyte layer 104 and the lower layer 103a in contact with the upper layer 103b; the lower layer 103a being provided below the upper layer 103b; a structure may be adopted in which three or more layers including these layers are stacked.

EXAMPLES

Results of producing lithium secondary batteries according to the embodiments, and measuring their characteristics and the like, will now be described.

Example 1

Battery Production

According to the procedure shown in FIGS. 3A to 3E, a lithium secondary battery according to Example 1 was produced.

First, as shown in FIG. 3A, as a positive-electrode current collector 102, an STO substrate doped with La (10 mm×10 mm, thickness: 500 μm), with a single-crystalline (110) plane, was provided. On the surface of the positive-electrode current collector 102, a lower layer 103a of the positive-electrode active substance layer, made of lithium cobaltate, was formed by PLD. As the target, a sintered oxide target containing Li and Co at a ratio of Li:Co=1.4:1 was used. The film formation conditions by PLD were as follows.
laser pulse energy: 50 mJ
pulse frequency: 2.5 Hz
oxygen partial pressure: 3 Pa
substrate temperature: 500° C.
distance between the target and the substrate: 55 mm The thickness Ta of the resultant lower layer 103a was 1000 nm.

Next, as shown in FIG. 3B, an upper layer 103b of lithium cobaltate was formed on the surface of the lower layer 103a by PLD. As the target, a sintered oxide target containing Li and Co at a ratio of Li:Co=1.3:1 was used. The film formation conditions by PLD were as follows.
laser pulse energy: 80 mJ
pulse frequency: 5 Hz
oxygen partial pressure: 10 Pa
substrate temperature: 470° C.
distance between the target and the substrate: 40 mm The thickness Tb of the resultant upper layer 103b was 1000 nm. Thus, a positive-electrode active substance layer 103 having the lower layer 103a and the upper layer 103b was obtained.

Next, as shown in FIG. 3C, a solid electrolyte layer 104 of lithium lanthanum titanate was formed on the surface of the positive-electrode active substance layer 103 by PLD. As the target, a sintered oxide target containing Li, La, and Ti at a ratio of Li:La:Ti=1.4:1:2 was used. The film formation conditions by PLD were as follows.
laser pulse energy: 250 mJ
pulse frequency: 1 Hz
oxygen partial pressure: 3 Pa
substrate temperature: 700° C.
distance between the target and the substrate: 40 mm The thickness of the resultant solid electrolyte layer 104 was 100 nm.

Next, as shown in FIG. 3D, a negative-electrode active substance layer 105 of indium was formed on the solid electrolyte layer 104 by a sputtering technique. The thickness of the resultant negative-electrode active substance layer 105 was 3000 nm.

Thereafter, as shown in FIG. 3E, on the negative-electrode active substance layer 105, a negative-electrode current collector 106 of platinum was formed by a sputtering technique. The thickness of the resultant negative-electrode active substance layer 105 was 100 nm. In this manner, the all-solid lithium secondary battery (hereinafter abbreviated as simply "battery") of Example 1 was completed.

Battery Evaluation

Next, characteristics of the battery of Example 1 produced by the above method were evaluated.

A potentiostat was connected to the positive-electrode current collector 102 and the negative-electrode current collector 106, and a discharge capacity after a constant-current (CC) charging up to 4.2 V at 65 μA, followed by a discharging down to 3.0 V, was defined as 1 C. The 0.2 C capacity was 118 μA/cm$^2$. The 2 C/1 C capacity ratio was 0.57. Furthermore, one cycle was defined as involving a CC charging up to 4.2 V and a discharging down to 3.0 V; then, an increase rate from a 100 Hz AC resistance value after 1 cycle to a resistance value after 10 cycles (resistance value at the $10^{th}$ cycle/resistance value at the $1^{st}$ cycle) was measured. The increase rate was found to be 1.65. Observation upon disassembly after 10 cycles showed no peeling of the solid electrolyte layer 104.

Figure 4A:
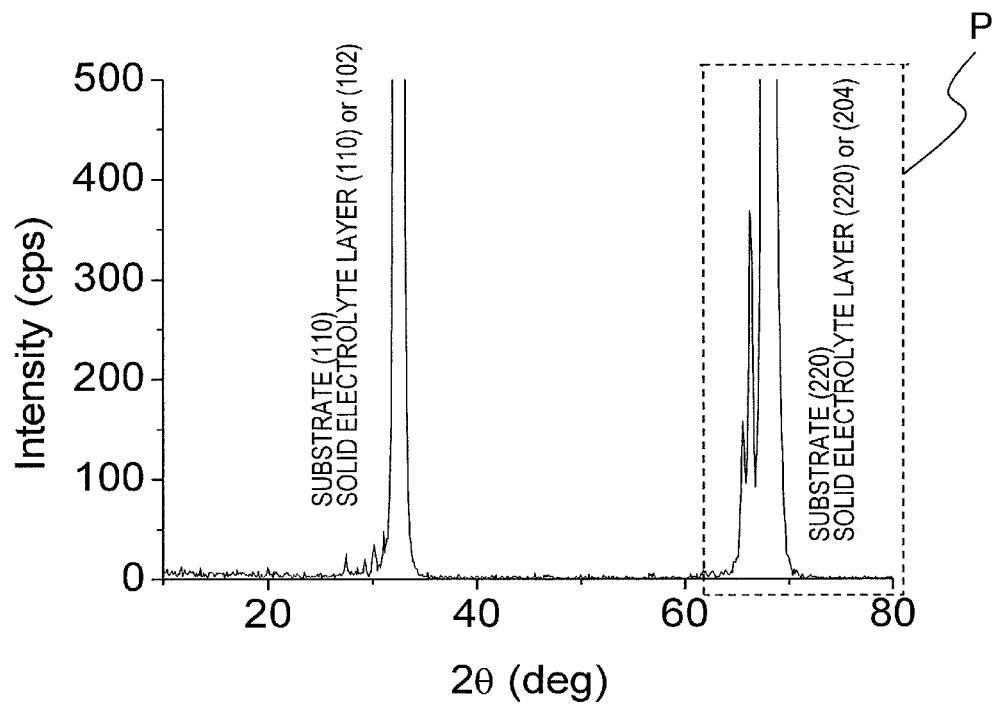
FIGS. 4A and 4B are diagrams showing X-ray diffraction patterns according to Example 1.
Figure 4B:
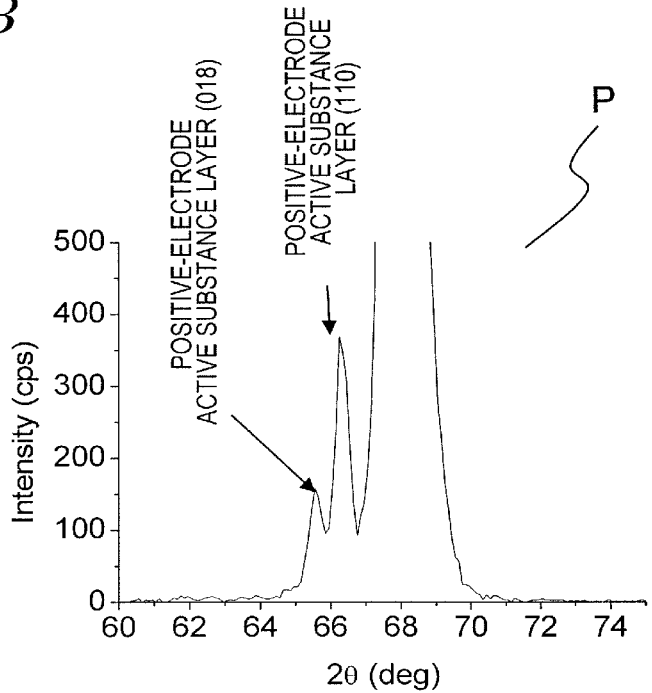

Moreover, by using an X-ray diffraction apparatus (X'Pert MRD manufactured by Philips), the crystal structures of the positive-electrode active substance layer 103 and the solid electrolyte layer 104 when discharged were examined. FIGS. 4A and 4B are showing the resultant X-ray diffraction patterns. FIG. 4B shows an enlarged view of portion P in FIG. 4A.

From these results, in the positive-electrode active substance layer 103, the peak intensity ratio (110)/(018) between the (110) plane and the (018) plane was 3.1. Peak intensities other than those of the (018) plane and the (110) plane, e.g., those of the (003) plane and the (104) plane, were very small; that is, the peak intensity of the (003) plane, for example, was ¹/₂₀ or less of a sum of the peak intensities of the (110) plane and the (018) plane.

On the other hand, in the solid electrolyte layer 104, no peaks other than integer multiples of the (110) plane peak and integer multiples of the (102) plane peak were observed. The crystal lattice along the a axis and the crystal lattice along the c axis of lithium lanthanum titanate were measured to be, respectively, 3.88 Å and 7.75 Å.

Next, through TEM observation of a cross section of the positive-electrode active substance layer 103, it was confirmed that the upper layer 103b of the positive-electrode active substance layer 103 was composed of two kinds of regions with different crystal orientations, and that the lower layer 103a was composed of regions oriented in the same direction.

Figure 5A:
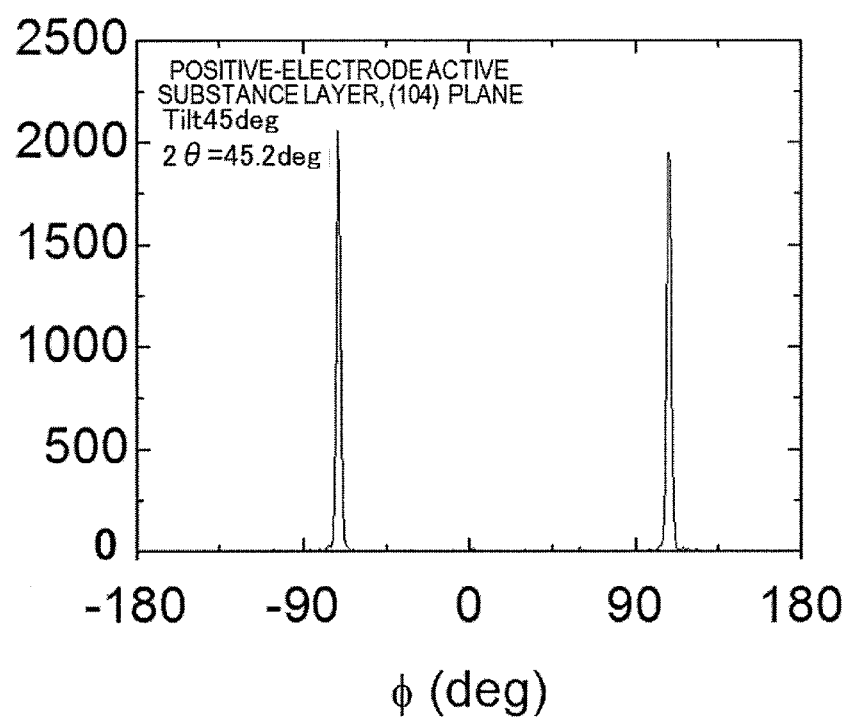
FIGS. 5A and 5B are diagrams showing X-ray diffraction patterns (Φ scans) according to Example 1.
Figure 5B:
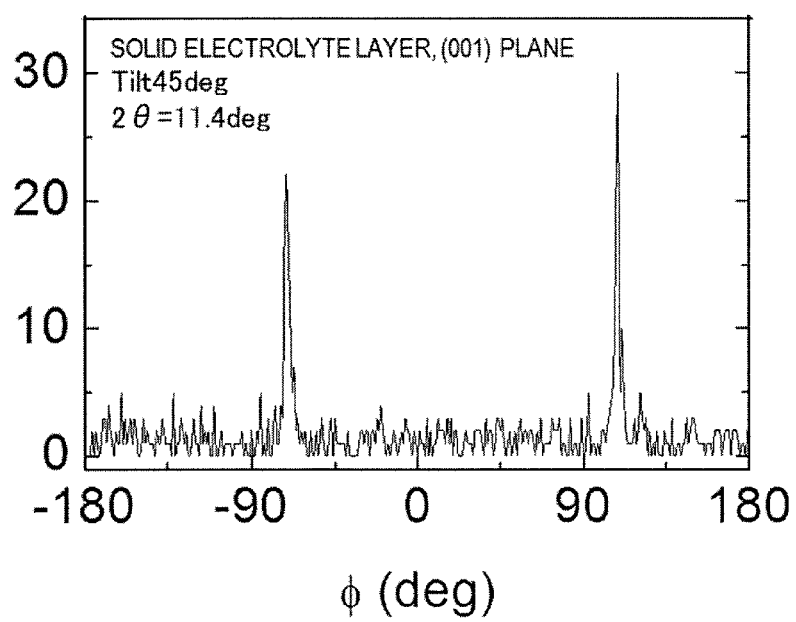

Then, a φ-scan by X-ray diffractometry was conducted. FIGS. 5A and 5B are diagrams showing φ-scan patterns in X-ray diffractometry for, respectively, the positive-electrode active substance layer and the solid electrolyte layer. From the φ-scan results, it was confirmed that the regions oriented in the (110) plane and the regions oriented in the (018) plane of the positive-electrode active substance layer 103 and the solid electrolyte layer 104 both had the same two-fold symmetry as that of the substrate, indicative of the fact that the layers 103 and 104 were epitaxial films.

Furthermore, while varying the elevation angle and the azimuth angle of the specimen, X-ray diffraction peak intensity measurements of the (003) plane, the (104) plane, and the (113) plane were taken (i.e., Pole-Figure method; for example, Non-Patent Document 1 discloses a Pole-Figure pattern of the (003) plane of a lithium cobaltate film which is oriented in the (018) plane). Crystal orientations along directions in the xy plane were derived from the Pole-Figure pattern, which revealed that the [−441] direction in the first regions 103b1 oriented in the (110) plane and the [−4-81] direction in the second regions 103b2 oriented in the (018) plane were parallel, and that the [2-21] direction in the first regions 103b1 oriented in the (110) plane and the [100] direction in the second regions 103b2 oriented in the (018) plane were parallel.

Moreover, by using an inductively coupled plasma-atomic emission spectrometer (an ICP analyzer designated SPS1700VR, manufactured by Hitachi High-Tech Science Corporation), the compositions of the positive-electrode active substance layer 103 and the solid electrolyte layer 104 were evaluated. This found that: Li:Co=1:1.0 in the positive-electrode active substance layer 103; and La:Li:Ti=0.56:0.32:1 in the solid electrolyte layer 104.

Example 2

A battery according to Example 2 was produced by a similar method to Example 1, except that the lower layer 103a of the positive-electrode active substance layer 103 had a thickness of 300 nm, and that the upper layer 103b had a thickness of 3000 nm.

Characteristics of the battery of Example 2 were evaluated, which revealed a 0.2 C capacity of 193 µA/cm². The 2 C/1 C capacity ratio was 0.55, and the increase rate in resistance value after 10 cycles was 1.82. Observation upon disassembly after 10 cycles showed no peeling of the solid electrolyte layer 104.

X-ray diffractometry showed that the peak intensity ratio (110)/(018) between the (110) plane and the (018) plane in the positive-electrode active substance layer 103 was 0.9. Peak intensities other than those of the (018) plane and the (110) plane, e.g., those of the (003) plane and the (104) plane, were very small; that is, the peak intensity of the (003) plane, for example, was 1/20 or less of a sum of the peak intensities of the (110) plane and the (018) plane.

In the solid electrolyte layer 104, no peaks other than integer multiples of the (110) plane peak and integer multiples of the (102) plane peak were observed.

Next, through TEM observation of a cross section of the positive-electrode active substance layer 103, it was confirmed that the upper layer 103b of the positive-electrode active substance layer 103 was composed of two kinds of regions with different crystal orientations, and that the lower layer 103a was composed of regions oriented in the same direction.

Then, a φ-scan by X-ray diffractometry was conducted, which revealed that regions oriented in the (110) plane and regions oriented in the (018) plane of the positive-electrode active substance layer 103 and the solid electrolyte layer 104 both had the same two-fold symmetry as that of the substrate, indicative of the fact that the layers 103 and 104 were epitaxial films.

Comparative Example 1

A battery according to Comparative Example 1 was produced by a similar method to Example 1, except that the upper layer 103b of the positive-electrode active substance layer 103 was formed under the same conditions as the PLD film formation conditions for the lower layer 103a, and that the lower layer 103a and the upper layer 103b of the positive-electrode active substance layer 103 had a total thickness of 3000 nm.

Characteristics of the battery of Comparative Example 1 were evaluated, which revealed a 0.2 C capacity of 174 µA/cm². The 2 C/1 C capacity ratio was 0.53, and the increase rate in resistance value after 10 cycles was 5.20.

X-ray diffractometry showed no peak other than that of the (110) plane in the positive-electrode active substance layer 103. In the solid electrolyte layer 104, no peaks other than integer multiples of the (110) plane peak and integer multiples of the (102) plane peak were observed.

Next, a φ-scan by X-ray diffractometry was conducted, which revealed that the positive-electrode active substance layer 103 and the solid electrolyte layer 104 both had the same two-fold symmetry as that of the substrate, indicative of being an epitaxial film.

Comparative Example 2

A battery according to Comparative Example 2 was produced by a similar method to Example 1, except that the upper layer 103b of the positive-electrode active substance layer 103 was formed under the same conditions as the PLD film formation conditions for the lower layer 103a, and that the lower layer 103a and the upper layer 103b of the positive-electrode active substance layer 103 had a total thickness of 3000 nm.

Characteristics of the battery of Comparative Example 2 were evaluated, which revealed a 0.2 C capacity of µA/cm². The 2 C/1 C capacity ratio was 0.54, and the increase rate in resistance value after 10 cycles was 3.42.

X-ray diffractometry showed no peak other than that of the (110) plane in the positive-electrode active substance layer 103. In the solid electrolyte layer 104, no peaks other than integer multiples of the (110) plane peak and integer multiples of the (102) plane peak were observed.

Next, a φ-scan by X-ray diffractometry was conducted, which revealed that the positive-electrode active substance layer 103 and the solid electrolyte layer 104 both had the same two-fold symmetry as that of the substrate, indicative of being an epitaxial film.

Comparative Example 3

A battery according to Comparative Example 3 was produced by a similar method to Example 1, except that the PLD film formation conditions for the solid electrolyte layer 104 were set as follows.
laser pulse energy: 100 mJ
pulse frequency: 5 Hz
oxygen partial pressure: 8 Pa
substrate temperature: 500° C.
distance between the target and the substrate: 40 mm Characteristics of the battery of Comparative Example 3 were evaluated, which revealed a 0.2 C capacity of 72 µA/cm². The 2 C/1 C capacity ratio was 0.34, and the increase rate in resistance value after 10 cycles was 1.92.

X-ray diffractometry showed no peak other than that of the (018) plane in the positive-electrode active substance layer 103. In the solid electrolyte layer 104, other than the peaks of the (110) plane and the (102) plane, peaks of the (001) plane, the (100) plane, and the (111) plane were also observed, indicative of being polycrystalline.

A φ-scan by X-ray diffractometry was conducted, which revealed that the positive-electrode active substance layer 103 had same two-fold symmetry as that of the substrate, indicative of being an epitaxial film. The solid electrolyte layer 104 exhibited no particular orientation.

(Results and Discussions)

The results of Examples 1 and 2 and Comparative Examples 1 to 3 above are shown in Table 1.

TABLE 1

| | orientation and thickness of positive-electrode active substance layer lower layer | orientation and thickness of positive-electrode active substance layer upper layer | orientation and thickness of solid electrolyte layer | result of battery characteristics evaluation | | |
|---|---|---|---|---|---|---|
| | | | | capacity (µAh) | capacity ratio 2 C/1 C | resistance increase rate (R_10cycle/ R_1cycle) |
| Example 1 | (110) 1000 nm | (018) + (110) 1000 nm | (110), (102) 100 nm | 118 | 0.57 | 1.65 |

TABLE 1-continued

| | orientation and thickness of positive-electrode active substance layer lower layer | orientation and thickness of positive-electrode active substance layer upper layer | orientation and thickness of solid electrolyte layer | capacity (µAh) | capacity ratio 2 C/1 C | resistance increase rate (R_10cycle/ R_1cycle) |
|---|---|---|---|---|---|---|
| Example 2 | (110) 300 nm | (018) + (110) 3000 nm | (110), (102) 100 nm | 193 | 0.55 | 1.82 |
| Comparative Example 1 | (110) 3000 nm | | (110), (102) 100 nm | 174 | 0.53 | 5.20 |
| Comparative Example 2 | (110) 1000 nm | | (110), (102) 100 nm | 46 | 0.54 | 3.42 |
| Comparative Example 3 | (110) 1000 nm | (018) + (110) 1000 nm | polycrystalline 100 nm | 72 | 0.34 | 1.92 |

The 2 C/1 C capacity ratio shown in Table 1 indicates changes in capacity when the rates of charging and discharging are increased. The higher this value is, the higher the output characteristics are. The resistance increase rate after 10 cycles to after 1 cycle indicates an increase rate in the resistance of the device through operation cycles of charging and discharging. The lower this value is, the better the cycle characteristics are.

First, cycle characteristics of the batteries of Examples and Comparative Examples will be compared. In the batteries of Examples 1 and 2, the resistance increase rate after 10 cycles is smaller than those of the batteries of Comparative Examples 1 and 2, indicative of improved cycle characteristics. This is presumably because, in Examples 1 and 2, the positive-electrode active substance layer 103 includes the lower layer 103a oriented in the (110) plane and the upper layer 103b, which in turn includes regions oriented in the (018) plane and regions oriented in the (110) plane; this has suppressed peeling of the solid electrolyte layer 104 provided on the upper layer 103b. Note that good cycle characteristics were also obtained in Comparative Example 3, which has a positive-electrode active substance layer of a similar structure to those in Examples 1 and 2.

In Comparative Examples 1 and 2, on the other hand, the positive-electrode active substance layer is a layer oriented in the (110) plane; there is no layer that includes regions oriented in the (018) plane and regions oriented in the (110) plane. Therefore, presumably, the strength of adherence between the positive-electrode active substance layer and the solid electrolyte layer was deteriorated due to an expansion stress that occurred in the layer oriented in the (110) plane, and peeling of the solid electrolyte layer occurred, thus resulting in the lower cycle characteristics. Comparative Example 1, in particular, suffered more significant deterioration in cycle characteristics because of the large thickness of its positive-electrode active substance layer (i.e., a layer oriented in the (110) plane).

In a comparison between the output characteristics of the batteries of Examples and Comparative Examples, it can be seen that the batteries of Examples 1 and 2 and Comparative Examples 1 and 2 have higher 2 C/1 C capacity ratios than that of the battery of Comparative Example 3. This is considered to be because the positive-electrode active substance layer 103 and the solid electrolyte layer 104 both have a crystal structure that is unlikely to hinder migration of lithium ions. On the other hand, in Comparative Example 3, the solid electrolyte layer 104 is polycrystalline; therefore, many crystal grain boundaries presumably exist in the z axis direction, along which lithium ions migrate. Thus, the rate of lithium diffusion decreased to result in the lower output characteristics.

Furthermore, the following is observed of the capacities of the batteries of Examples and Comparative Examples. In these Examples and Comparative Examples, the negative-electrode active substance layer 105 has the same construction, so that their battery capacities are mainly determined by the amount of active substance that is contained in the respective positive-electrode active substance layer 103. That is, the capacity increases as the positive-electrode active substance layer 103 becomes thicker.

Examples 1 and 2 and Comparative Example 1 attained high capacities because their positive-electrode active substance layers are as thick as 2000 nm or more. In Comparative Example 1, however, the cycle characteristics were significantly deteriorated because, as has been described earlier, expansion stress increases as the positive-electrode active substance layer 103 becomes thicker. On the other hand, Examples 1 and 2 attained high cycle characteristics in spite of the thick positive-electrode active substance layer 103. This is considered to be because, since the positive-electrode active substance layer 103 has the aforementioned multilayer structure, stress due to expansion/contraction of the active substance was alleviated, and deteriorations in cycle characteristics were suppressed. From these results, it was confirmed that the embodiments presented herein can realize high capacity, high output power, and high cycle characteristics at the same time.

The all-solid lithium secondary battery disclosed herein has high charge-discharge characteristics and reliability, and is useful as a main power supply for a mobile batteried device, a main power supply for a power tool, and an industrial-use main power supply for an electric vehicle or the like.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:
1. An all-solid lithium secondary battery comprising:
   a positive electrode including a positive-electrode active substance layer;
   a negative electrode including a negative-electrode active substance layer, the negative-electrode active substance layer allowing lithium ions to be inserted and allowing inserted lithium ions to be released; and a solid electrolyte layer interposed between the positive electrode and the negative electrode, wherein, the positive-electrode active substance layer comprises lithium cobaltate, and has an $\alpha$-NaFeO$_2$ type crystal structure;

given an x axis and a y axis which are defined as two axes that are parallel to a principal face of the positive-electrode active substance layer, and a z axis which is defined as an axis that is perpendicular to the principal face, the positive-electrode active substance layer has a multi-layer structure including a lower layer and an upper layer which is interposed between the lower layer and the solid electrolyte layer;

the lower layer is oriented in the (110) plane;

the upper layer is composed only of first regions oriented in the (110) plane and second regions oriented in the (018) plane, the first regions and second regions being mixedly present in an xy plane of the positive-electrode active substance layer;

the solid electrolyte layer comprises lithium lanthanum titanate and has a tetragonal perovskite-type crystal structure; and the solid electrolyte layer is oriented in the (110) plane or the (102) plane.

2. The all-solid lithium secondary battery of claim 1, wherein a [−441] direction in the first regions is parallel to a [−4-81] direction in the second regions, and a [2-21] direction in the first regions is parallel to a [100] direction in the second regions.

3. The all-solid lithium secondary battery of claim 1, wherein a thickness Tb of the upper layer is greater than a thickness Ta of the lower layer.

4. The all-solid lithium secondary battery of claim 1, wherein a ratio Ta/Tb between a thickness Ta of the lower layer and a thickness Tb of the upper layer is not less than 0.1 and not more than 1.

5. The all-solid lithium secondary battery of claim 1, wherein, in an X-ray diffraction pattern of the lithium cobaltate, a ratio (I(110)/I(018)) between a peak intensity I(110) of the (110) plane and a peak intensity I(018) of the (018) plane satisfies the relationship 0.9≤(110)/I(018)≤3.1.

6. The all-solid lithium secondary battery of claim 1, wherein the positive-electrode active substance layer is an epitaxial film.

7. The all-solid lithium secondary battery of claim 6, wherein the positive-electrode active substance layer is formed on a current collector which is a strontium titanate substrate, the strontium titanate substrate being doped with a dopant and electrically conductive.

8. The all-solid lithium secondary battery of claim 1, wherein the solid electrolyte layer is an epitaxial film.

9. The all-solid lithium secondary battery of claim 1, wherein, in the upper layer of the positive-electrode active substance layer, there is no overlap between the first regions and the second regions along the z axis direction.

\* \* \* \* \*